United States Patent
Nakashima et al.

(10) Patent No.: US 12,474,328 B2
(45) Date of Patent: Nov. 18, 2025

(54) FUNCTIONAL UNIT FOR TOILET SYSTEM AND TOILET SYSTEM

(71) Applicant: LIXIL Corporation, Tokyo (JP)

(72) Inventors: Yusuke Nakashima, Tokyo (JP); Takahito Nakase, Tokyo (JP); Yusuke Sato, Tokyo (JP)

(73) Assignee: LIXIL Corporation, Tokyo (JP)

(*) Notice: Subject to any disclaimer, the term of this patent is extended or adjusted under 35 U.S.C. 154(b) by 844 days.

(21) Appl. No.: 17/764,522

(22) PCT Filed: Sep. 29, 2020

(86) PCT No.: PCT/JP2020/036794
§ 371 (c)(1),
(2) Date: Mar. 28, 2022

(87) PCT Pub. No.: WO2021/065858
PCT Pub. Date: Apr. 8, 2021

(65) Prior Publication Data
US 2022/0341920 A1 Oct. 27, 2022

(30) Foreign Application Priority Data
Sep. 30, 2019 (JP) .................. 2019-180097

(51) Int. Cl.
*G01N 33/52* (2006.01)
*E03D 9/00* (2006.01)

(52) U.S. Cl.
CPC .............. *G01N 33/528* (2013.01); *E03D 9/00* (2013.01); *E03D 9/005* (2013.01)

(58) Field of Classification Search
CPC ........ E03D 9/00; E03D 9/005; G01N 33/493; G01N 33/52; G01N 33/528; G01N 33/58; G01N 33/6827
See application file for complete search history.

(56) References Cited

U.S. PATENT DOCUMENTS

| | | | | |
|---|---|---|---|---|
| 5,584,079 A | * | 12/1996 | Wong ...................... | E03D 9/031 4/226.1 |
| 2009/0000016 A1 | * | 1/2009 | Sawalski ................. | E03D 9/032 4/223 |

(Continued)

FOREIGN PATENT DOCUMENTS

| CN | 104614371 A | | 5/2015 |
|---|---|---|---|
| CN | 220747128 U | * | 4/2024 |

(Continued)

OTHER PUBLICATIONS

(JP 2017-066639A) English translation (Year: 2025).*
CN-220747128-U English Translation (Year: 2025).*
JPH0685476U English Translation (Year: 2025).*

*Primary Examiner* — Jennifer Wecker
*Assistant Examiner* — Jonathan Bortoli
(74) *Attorney, Agent, or Firm* — Morrison & Foerster LLP (57) ABSTRACT

A functional unit for a toilet system includes: a discharge section discharging, into a toilet bowl, a test agent that allows for determination of a health condition of a human body through a reaction with urine; an input device configured to allow a user to perform an operation for discharging the test agent from the discharge section; and a control section controlling the discharge section based on the operation of the input device by the user. A functional unit for a toilet system includes: a discharge section discharging, into a toilet bowl, a test agent that allows for determination of a health condition of a human body through a reaction with urine; a control section controlling the discharge section; and a sensor, in which the control section performs control to discharge at least one of foam or the test agent based on a detection by the sensor.

8 Claims, 6 Drawing Sheets

(56) References Cited

U.S. PATENT DOCUMENTS

2012/0135529 A1* 5/2012 Guthery ................ G01N 33/72
                                                                                                436/66
2014/0147924 A1   5/2014 Wheeldon et al.

FOREIGN PATENT DOCUMENTS

| JP | H0685476 U | * | 12/1994 |
|---|---|---|---|
| JP | H10-123128 A | | 5/1998 |
| JP | 2005-330791 A | | 12/2005 |
| JP | 2015-500471 A | | 1/2015 |
| JP | 2017066639 A | * | 4/2017 |
| KR | 10-2004-0063304 A | | 7/2004 |
| WO | 2013/082267 A1 | | 6/2013 |

* cited by examiner

FUNCTIONAL UNIT FOR TOILET SYSTEM AND TOILET SYSTEM

CROSS REFERENCE TO RELATED APPLICATIONS

This application is a national stage application under 35 USC 371 of International Application No. PCT/JP2020/036794, filed Sep. 29, 2020, which claims the priority of Japanese Application No. 2019-180097, filed Sep. 30, 2019, the entire contents of each priority application of which is incorporated herein by reference.

FIELD OF THE DISCLOSURE

The present disclosure relates to a functional unit for a toilet system and to a toilet system.

BACKGROUND OF THE DISCLOSURE

Conventionally, urine tests are conducted at medical or other institutions to diagnose health conditions of human bodies. Japanese Unexamined Patent Application, Publication No. H10-123128 discloses a urine protein-testing solid agent for testing abnormality of the amount of protein in urine by putting a pH indicator that produces a color reaction through a reaction with urine and a buffer agent in a flush water tank of a household flush toilet, and then discharging the pH indicator and the buffer agent into water pooled in the flush toilet.

For the purpose of restricting spread of droplets in conventional household flush toilets, there is a commercially available product that uses a technique to discharge, before a toilet is used, foam onto the top of water pooled in the toilet to cover the surface of the pooled water.

SUMMARY OF THE DISCLOSURE

In the case of the solid agent disclosed in Japanese Unexamined Patent Application, Publication No. H10-123128, the pH indicator is slowly released inside a flush water tank of a flush toilet. It is therefore necessary to put the solid agent in the flush water tank beforehand according to the time of a test, and it is complicated to adjust changes in test agent concentration with the slow-release in time for the test. It is also necessary to use the test agent in a large amount depending on the amount of the flush water that is stored. Furthermore, it is necessary to use the buffer agent because the pH of the flush water changes when new water is added into the flush water tank.

The present disclosure provides a functional unit for a toilet system. The functional unit includes: a discharge section discharging, into a toilet bowl, a test agent that allows for determination of a health condition of a human body through a reaction with urine; an input device configured to allow a user to perform an operation for discharging the test agent from the discharge section; and a control section controlling the discharge section based on the operation of the input device by the user.

DETAILED DESCRIPTION OF THE DISCLOSURE

Figure 1:
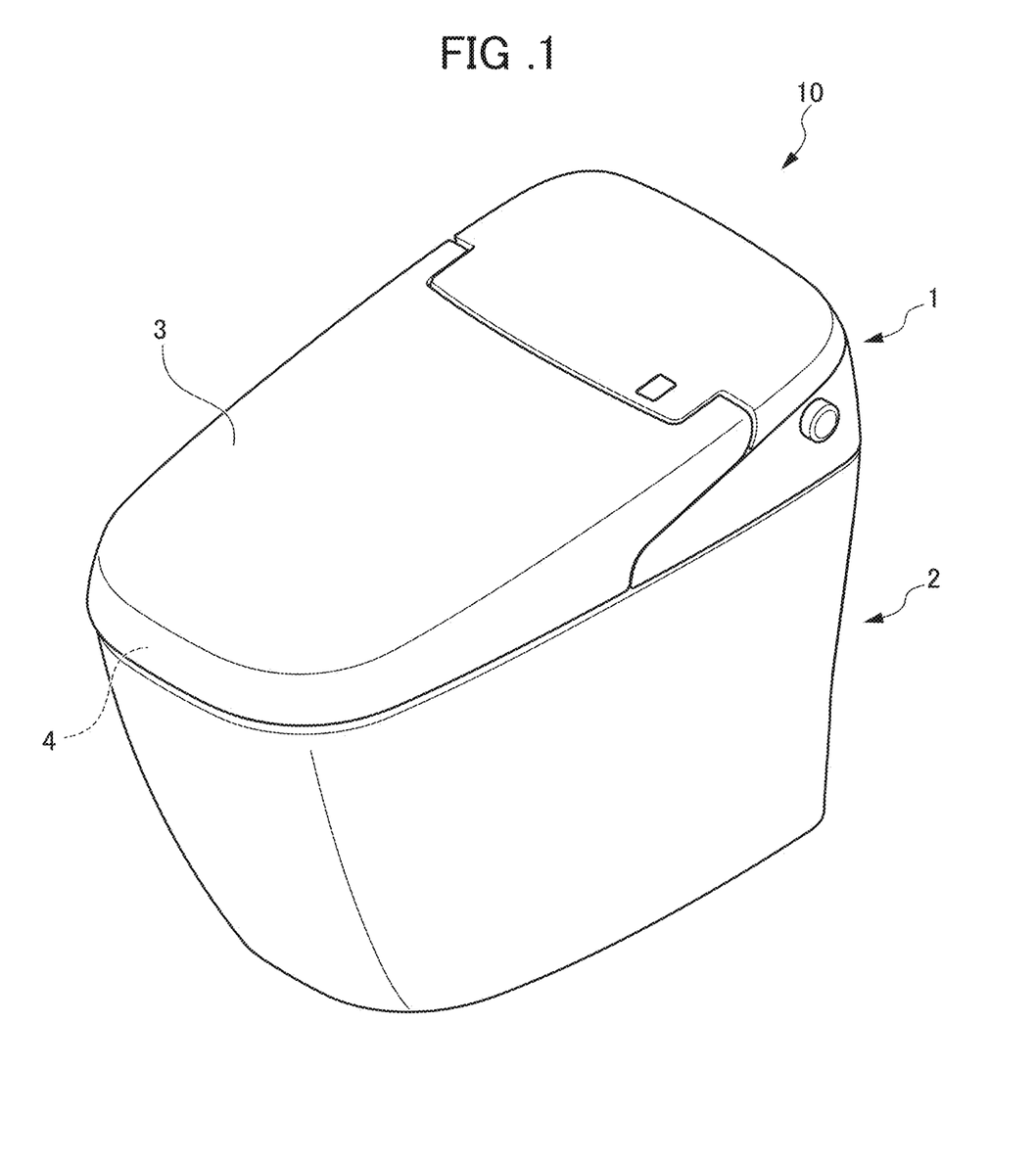
FIG. 1 is a diagram illustrating a toilet system according to some embodiments.
Figure 2:
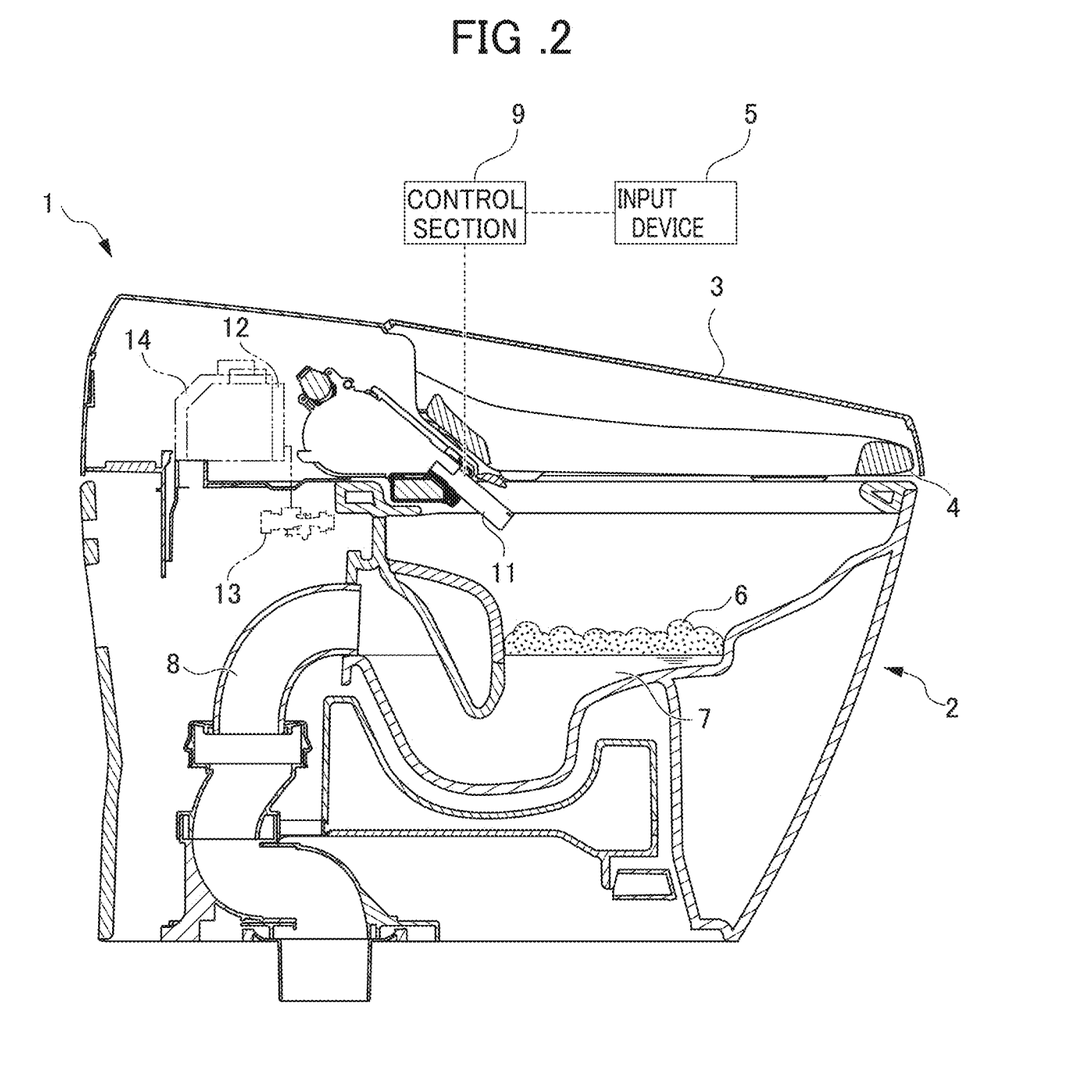
FIG. 2 is a schematic cross-sectional view of a toilet system according to some embodiments.

A toilet system 10 according to some embodiments includes a functional unit 1, a toilet bowl 2, a lid 3, and a toilet seat 4. The functional unit 1 includes an input device 5, a control section 9, a discharge section 11, a foaming agent tank 12, an ejector 13, and a test agent tank 14.

The discharge section 11, in some embodiments, is located in an upper portion of the toilet bowl 2 and discharges a test agent into the toilet bowl 2 to allow the test agent to come in contact with urine. The discharge section 11 discharges the test agent by spraying the test agent using a spray-type nozzle. The discharge section is not limited to the form described above as long as the discharge section can discharge the test agent into the toilet bowl 2. For example, the discharge section may be directly fixed to the toilet bowl 2, or may be fixed to a casing forming the functional unit 1 or to a base plate disposed on the upper portion of the toilet bowl 2. For another example, the discharge section may discharge the test agent in a liquid state as is rather than discharging the test agent in a mist state, and may discharge the test agent directly to a pooled water section 7. Alternatively, the discharge section may discharge the test agent to an area other than the pooled water section 7, such as a surface of the toilet bowl.

The foaming agent tank 12 stores a foaming agent to be used to generate foam 6 in the ejector 13. The foaming agent is, for example, a surfactant, but is not particularly limited as long as the foaming agent does not interfere with a reaction of the test agent.

Figure 3:
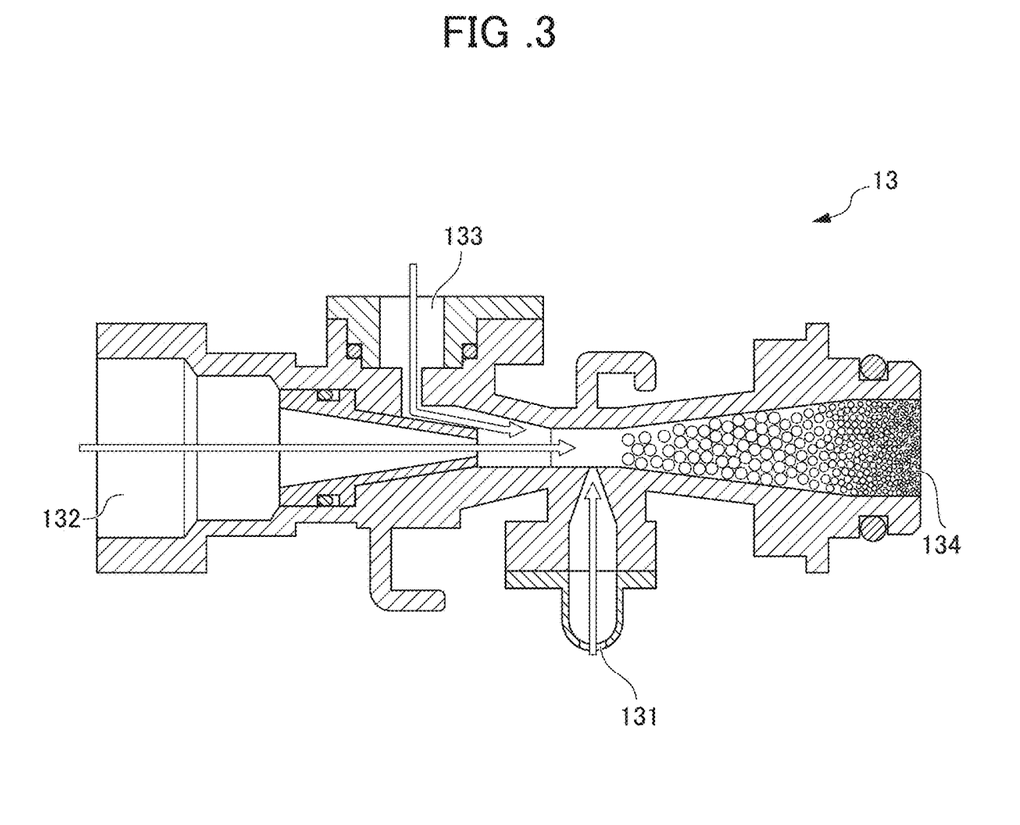
FIG. 3 is a diagram illustrating an ejector in a toilet system according to some embodiments.

The ejector 13 supplies the foam 6 to the top of the pooled water section 7 in the toilet bowl 2. Inside the ejector 13, the following is mixed to generate the foam 6: the foaming agent supplied from the foaming agent tank 12 to a foaming agent supply port 131 using a pump; foam generation water supplied through a foam generation water supply port 132 as a result of a valve being opened; and air drawn in through an air supply port 133 as a result of the inside of the ejector 13 having a negative pressure due to the water flowing therein. The thus generated foam 6 is discharged from a foam discharge port 134 to the pooled water section 7 in the toilet bowl 2. As a result, the foam 6 covers the pooled water section, thereby reducing droplets from the water surface of the pooled water section 7 when the toilet is used and allowing the toilet system 10 to be used cleanly.

The test agent tank 14 stores a test agent that allows for determination of a health condition of a human body through a reaction with urine. The test agent tank 14 is accommodated in the functional unit 1 and is separate from a flush water tank. The test agent is not particularly limited, and may be one that allows for determination of the amount of protein or sugar in urine, or may be one that allows for determination of the pH or the specific gravity of urine.

The test agent that allows for determination of a health condition refers to, for example, a test agent that reacts with a substance in urine or a test agent that allows for identification of urine properties. No particular limitations are placed on the method for such determination. For example, it is preferable to visually check the color resulting from a reaction between an indicator and a specific detection target substance. This method is preferable because the test is performed easily, and the result of the test can be recognized at a glance. Alternatively, the toilet system 10 may have, for example, an ultraviolet lamp, and a reaction between an indicator and a test target substance may be identified through ultraviolet irradiation.

Specific examples of possible test targets include urobilinogen, nitrite, bilirubin, protein, glucose, pH, occult blood, white blood cells, specific gravity, and creatinine. Table 1 shows associations between specific test targets and indicators. Indicators of different types listed in association with a test parameter in Table 1 are used in an appropriate combination of the indicators of different types.

TABLE 1

| Test target | Indicator |
| --- | --- |
| Urobilinogen | 4-Methoxybenzenediazonium tetrafluoroborate |
| Nitrite | Sulfanilamide |
|  | N-(1-naphthylamino)-3-propanesulfonic acid |
| Bilirubin | 2,4-Dichloroaniline |
|  | Sodium nitrite |
| Protein | Tetrabromophenol blue |
| Glucose | Glucose oxidase |
|  | Peroxidase |
|  | O-tolidine |
| PH | Phenolphthalein |
|  | Bromothymol blue |
|  | Methyl red |
| Occult blood | Cumene hydroperoxide |
|  | 3,3',5,5'-Tetramethylbenzidine (TMB) |
| White blood cells | 2-Methoxy-4-(N-morpholino)-benzenediazonium chloride zinc chloride double salt |
|  | 3-(N-toluenesulfonyl-L-alanyloxy)-indole |
| Specific gravity | Bromothymol blue |
|  | Methoxy ethylene maleic anhydride copolymer |
| Creatinine | 1,4-Diisopropylbenzene dihydroperoxide (DBDH) |
|  | 3,3',5,5'-Tetramethylbenzidine (TMB) |
|  | Copper sulfate |

The test agent tank 14 may be capable of storing test agents of different types such as those listed above. For example, the funct is sprayed to the foam 6 before the user voids. That way, it is possible to restrict the spread of droplets from the pooled water section 7 and to perform the test with a small amount of test agent. However, even if the foam 6 is not discharged onto the pooled water section 7 in the toilet bowl 2 or even if the test agent is sprayed to an area other than the pooled water section 7, it is possible to perform the test as long as a color reaction occurs between the test agent and urine in the pooled water section 7 or on the surface of the toilet bowl 2.

Figure 4:
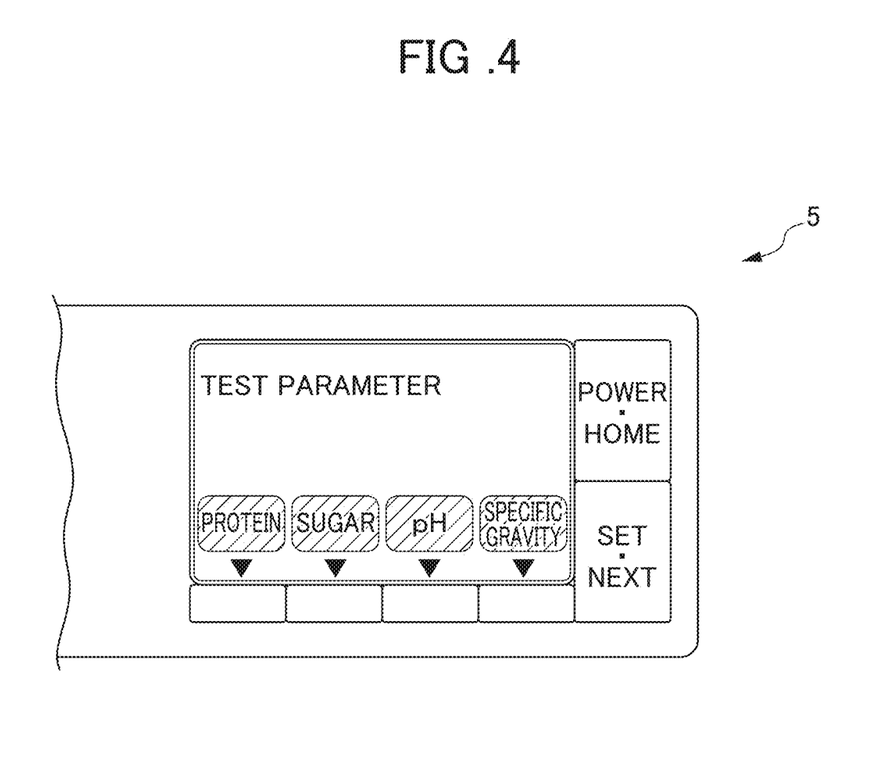
FIG. 4 is a diagram illustrating an input device in a toilet system according to some embodiments.

The input device 5 is not limited to the form shown in FIG. 4 as long as the input device 5 allows the user to perform the operation for discharging the test agent depending on the test parameter as described above. Preferably, the input device 5 is located within a range where the user can operate the input device 5 while seated on the toilet seat 4. The input device 5 may be attached to a side of a toilet housing or may be attached directly to a wall. From the viewpoint of space saving and design, the input device 5 may incorporate warm-water washing toilet operation buttons.

The control section 9 is accommodated in a housing of the functional unit 1. The control section 9 controls the functional unit 1 based on the operation of the remote controller to cause the ejector 13 to generate the foam 6 and cause the discharge section 11 to discharge the test agent. The discharge of the foam 6 and the test agent may be caused manually by the user as the user wishes, or may be caused automatically. For example, the control section 9 may have a control mode for automatically discharging the foam 6 and the test agent or only the test agent into the toilet bowl 2 at night when the toilet is not often used or at a specific time before the user voids.

The automatic discharge of the foam 6 and the test agent may be caused at any time as long as the time is before the user voids. Specifically, the automatic discharge may be caused, for example, when the user enters the toilet room, when the user sits on the toilet seat, or when the user raises the toilet seat. For example, the control section 9, in some embodiments, has a mode for automatically discharging the foam 6 when the user raises the toilet seat. This mode prevents failure to discharge the foam 6 to ensure the effect of restricting the spread of droplets, while allowing the user to select, when the user wishes to perform a test, a desired test parameter using the input device 5 to perform the test.

The user can choose to discharge only the foam 6, only the test agent, or both the foam 6 and the test agent. In the foregoing, a case is described where only the foam 6 is automatically discharged. Alternatively, for example, a sensor 17 may be provided to detect the user's entry to the toilet room, and both the foam 6 and the test agent may be automatically discharged when the user enters the toilet room. In this case, the user can continuously perform tests without the need to enter a specific test parameter into the input device 5 every time the user performs a test. Alternatively, only the test agent may be automatically discharged without the foam 6 being generated. In this case, it is possible to perform a test without the use of the foam 6.

As described above, the toilet system 10 according to some embodiments makes it possible to reduce the amount of test agent to be used in a health condition test in a household flush toilet and to perform such a test at any time.

Figure 5:
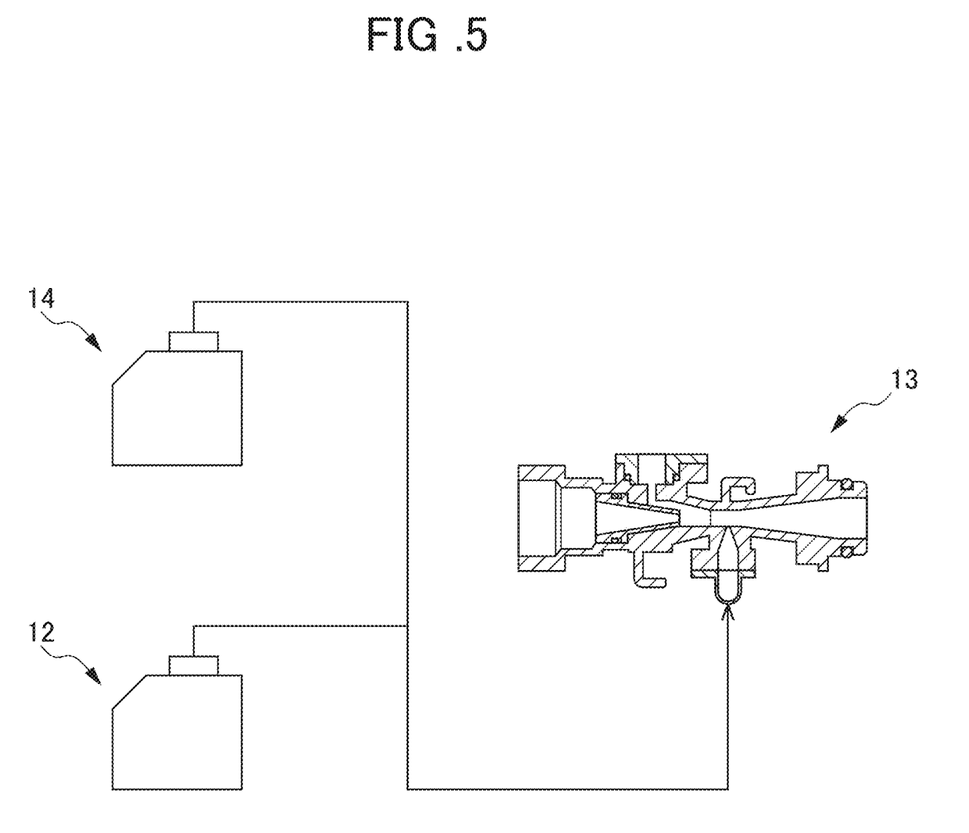
FIG. 5 is a diagram illustrating a test agent discharging mechanism according to some embodiments.

A toilet system 210 (external appearance not shown) according to some embodiments differs from the toilet system 10 described above in the mechanism for supplying the test agent.

In the toilet system 210, the test agent is discharged by the ejector 13. The test agent and the foaming agent are stored in separate tanks. The test agent and the foaming agent are mixed, supplied to the ejector, and then discharged as the foam 6 onto the pooled water section 7 in the toilet bowl 2. That is, the foam 6 contains the test agent mixed therein. This mechanism makes it possible to test a health condition through urine coming in contact with the foam 6.

The test agent tank 14 in some embodiments is also capable of storing test agents of different types. The user can perform a test for a desired test parameter by selecting a test agent(s) of desired type using the input device 5 and causing the test agent to be mixed in the foaming agent, thereby forming the foam 6 containing the test agent.

Only a small amount of water is needed when the foam 6 is formed from water and a liquid mixture of the test agent and the foaming agent. According to some embodiments, therefore, it is possible to perform the test with a small amount of test agent as in the toilet system 10 described above.

Figure 6:
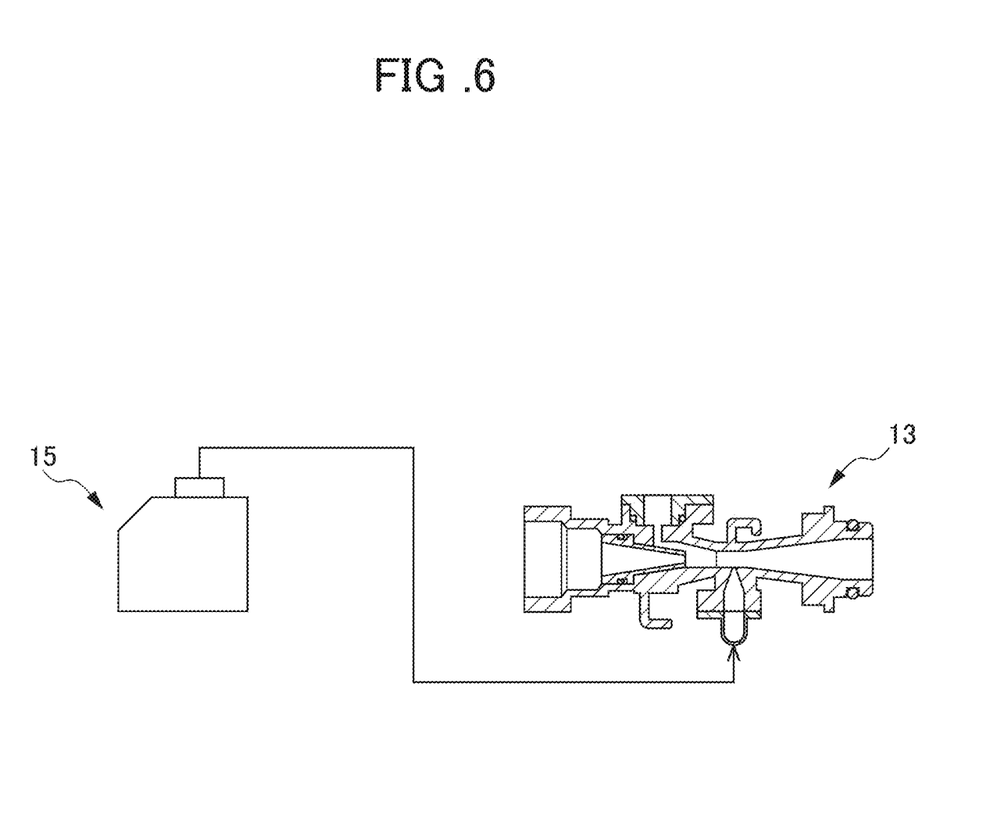
FIG. 6 is a diagram illustrating a test agent discharging mechanism according to some embodiments.

A toilet system 310 (external appearance not shown) according to some embodiments differs from the toilet system 210 described above in the mechanism for supplying the test agent.

In the toilet system 310 according to some embodiments, the test agent is discharged by the ejector 13 as in the toilet system 210 according to some embodiments. However, unlike the toilet system 210, the toilet system 310 mixes and stores the test agent and the foaming agent in a single mixing tank 15. This liquid mixture is supplied to the ejector, and then discharged as the foam 6 onto the pooled water section 7 in the toilet bowl 2.

As in the case of the test agent tanks 14 described above, the mixing tank 15 in some embodiments is capable of storing liquid mixtures of the foaming agent and test agents of different types, so that it is possible to perform a test for a desired one of test parameters.

As described above, the toilet systems according to some embodiments make it possible to reduce the amount of test agent to be used in a health condition test in a household flush toilet and to perform a test at any time.

The embodiments are not limited to the foregoing description, and may be modified or improved. For example, the entry operation for discharging the test agent may be implemented through speech recognition. In this case, a microphone for the speech recognition corresponds to the input device 5.

The invention claimed is:

1. A functional unit for using with a toilet bowl of a toilet system, the functional unit comprising:
    a discharge member configured to discharge an amount of a test agent into the toilet bowl, the test agent formulated to chemically react with urine from a user to enable determination of a health condition of the user;
    an input device configured to receive input from the user to initiate discharging the test agent from the discharge member based on the input by the user;
    a foam supply device configured to supply foam onto a pooled water section inside the toilet bowl using a foaming agent before the amount of the test agent is discharged into the toilet bowl by the discharge member, wherein the discharge member is configured to discharge the amount of the test agent toward the foam supplied onto the pooled water section by the foam supply device; and
    a controller configured to control the discharge member based on the input by the user such that the foam supply device supplies the foam in the pooled water section before the discharge member discharges the amount of the test agent onto the foam supplied onto the pooled water section by the foam supply device.

2. The functional unit of claim 1 further comprising:
a sensor, wherein the controller is configured to discharge at least one of foam or the test agent based on a detection by the sensor.

3. The functional unit of claim 1, wherein the discharge member is a sprayer.

4. The functional unit of claim 1 further comprising:
a determination controller configured to determine a presence or an absence of foam on the pooled water section, wherein the controller is configured to discharge the test agent when the determination controller determines foam is present in the toilet bowl, and to control the foam supply device to discharge foam into the toilet bowl before the discharge member discharges the test agent when the determination controller determines foam is absent from the toilet bowl.

5. The functional unit of claim 1 comprising:
a foaming agent storage tank configured to store foaming agent; and
a test agent storage tank configured to store test agent.

6. The functional unit of claim 1, wherein the controller is configured to receive a user selection of at least one test agent of a plurality of different test agents for the discharge member to discharge into the toilet bowl.

7. The functional unit of claim 1, wherein the controller is configured to perform a control mode for discharging the test agent into the toilet bowl before the user voids.

8. A toilet system comprising:
the functional unit of claim 1; and
a toilet body having the toilet bowl.

* * * * *